US012606949B2

(12) United States Patent
Gunn

(10) Patent No.: US 12,606,949 B2
(45) Date of Patent: Apr. 21, 2026

(54) DOOR LOCK ASSEMBLY FOR A WASHING MACHINE APPLIANCE

(71) Applicant: Haier US Appliance Solutions, Inc., Wilmington, DE (US)

(72) Inventor: Tanner Davis Gunn, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 92 days.

(21) Appl. No.: 18/597,453

(22) Filed: Mar. 6, 2024

(65) Prior Publication Data

US 2025/0283269 A1 Sep. 11, 2025

(51) Int. Cl.

| | |
|---|---|
| ***D06F 39/14*** | (2006.01) |
| ***D06F 23/02*** | (2006.01) |
| ***E05B 63/00*** | (2006.01) |
| ***E05B 65/00*** | (2006.01) |

(52) U.S. Cl.

CPC .............. *D06F 39/14* (2013.01); *D06F 23/02* (2013.01); *E05B 63/0069* (2013.01); *E05B 65/00* (2013.01)

(58) Field of Classification Search

CPC ...... D06F 39/14; D06F 23/02; E05B 63/0069; E05B 65/00

USPC .......................................................... 68/12.26

See application file for complete search history.

(56) References Cited

U.S. PATENT DOCUMENTS

| | | | |
|---|---|---|---|
| 9,416,568 | B2 | 8/2016 | Promutico |
| 10,066,330 | B2 | 9/2018 | Blancuzzi et al. |
| 10,385,586 | B2 | 8/2019 | Maiero et al. |
| 2008/0256999 | A1 | 10/2008 | Hapke et al. |
| 2016/0024703 | A1 | 1/2016 | Blancuzzi et al. |

FOREIGN PATENT DOCUMENTS

| | | | | |
|---|---|---|---|---|
| CN | 117627463 | A * | 3/2024 | ......... A47L 15/4529 |
| DE | 3006307 | A1 | 8/1981 | |
| EP | 2159316 | B1 | 10/2011 | |
| EP | 2251479 | B1 | 4/2014 | |

OTHER PUBLICATIONS

CN117627463A—machine translation (Year: 2024).*

* cited by examiner

*Primary Examiner* — Tinsae B Ayalew

(74) *Attorney, Agent, or Firm* — Dority & Manning, P.A.

(57) ABSTRACT

A washing machine appliance includes a cabinet including a front panel defining a chamber opening, a wash tub positioned within the cabinet and defining a wash chamber, a wash basket rotatably mounted within the wash tub, a door rotatably mounted to the front panel and moveable between open and closed positions, and a door lock assembly for selectively locking the door in the closed position. The door lock assembly includes a door lock extending within the cabinet and including a latch moveable between locked and unlocked positions and a reset actuator for moving the latch from the locked to the unlocked position, and a reset lever for engaging the reset actuator to move the latch from the locked to the unlocked position. The reset lever is rotatable mounted within the cabinet and the front panel of the cabinet defines an opening for providing access to the reset lever.

20 Claims, 8 Drawing Sheets

DOOR LOCK ASSEMBLY FOR A WASHING MACHINE APPLIANCE

FIELD OF THE INVENTION

The present subject matter relates generally to washing machine appliances, or more specifically, to the door lock assembly of a washing machine appliance.

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. Washing machine appliances also generally include a door that can be opened to provide access to the wash chamber and closed to prohibit access to the wash chamber. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle, a drain pump assembly may operate to discharge water from within sump.

Certain conventional washing machine appliances include a door lock assembly for selectively locking or unlocking the door of the washing machine appliance during a wash cycle. Notably, door lock assemblies typically include a manual reset mechanism which allows a user to unlock the door, for example, when there is a loss of power to the washing machine appliance. However, such manual reset mechanisms are located within the washing machine appliance and require disassembly/removal of components of the washing machine appliance to access the manual reset mechanism. Such required disassembly/removal of components to access the manual reset mechanism is complicated and time consuming for users.

Accordingly, a washing machine appliance having an improved door lock assembly would be desirable. More specifically, a door lock assembly that is capable of being reset without disassembling the washing machine appliance would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a washing machine appliance is provided including a cabinet comprising a front panel defining a chamber opening, a wash tub positioned within the cabinet and defining a wash chamber, a wash basket rotatably mounted within the wash tub for receiving a load of clothes, a door rotatably mounted to the front panel and moveable between an open position for providing access to the wash chamber and a closed position for prohibiting access to the wash chamber, and a door lock assembly for selectively locking the door in the closed position. The door lock assembly includes a door lock extending within the cabinet. The door lock includes a latch moveable between a locked position and an unlocked position and a reset actuator for moving the latch from the locked position to the unlocked position. The door lock assembly also includes a reset lever for engaging the reset actuator of the door lock to move the latch from the locked position to the unlocked position. The reset lever is rotatably mounted within the cabinet and the front panel of the cabinet defines a reset opening for providing access to the reset lever.

In another exemplary embodiment, a door lock assembly for a washing machine appliance is provided. The washing machine appliance includes a cabinet comprising a front panel defining a chamber opening, a wash tub positioned within the cabinet and defining a wash chamber, and a door rotatably mounted to the front panel and moveable between an open position for providing access to the wash chamber and a closed position for prohibiting access to the wash chamber. The door lock assembly includes a door lock extending within the cabinet. The door lock includes a latch moveable between a locked position and an unlocked position and a reset actuator for moving the latch from the locked position to the unlocked position. The door lock assembly also includes a reset lever for engaging the reset actuator of the door lock to move the latch from the locked position to the unlocked position. The reset lever is rotatably mounted within the cabinet and the front panel of the cabinet defines a reset opening for providing access to the reset lever.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
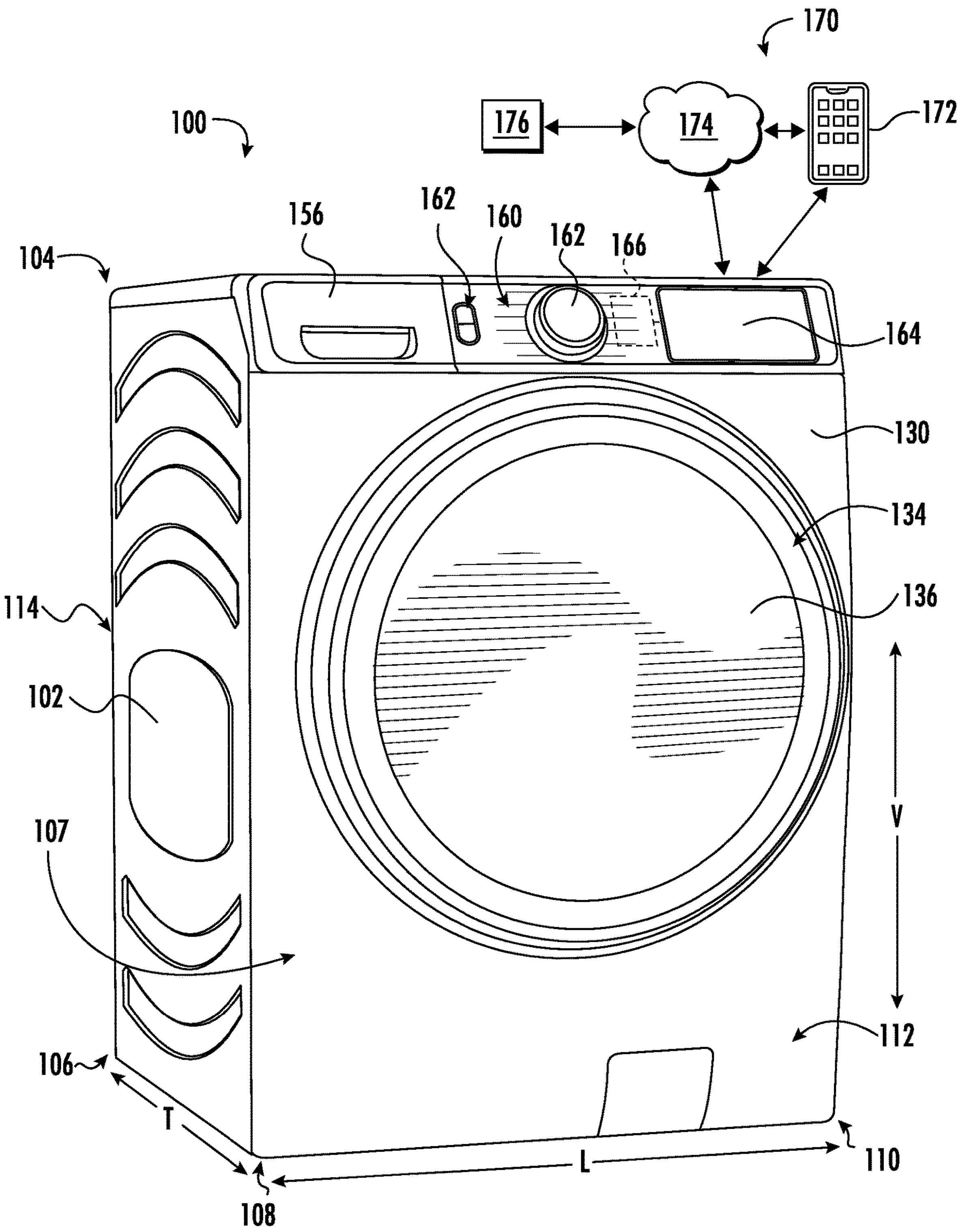
FIG. 1 provides a perspective view of a washing machine appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
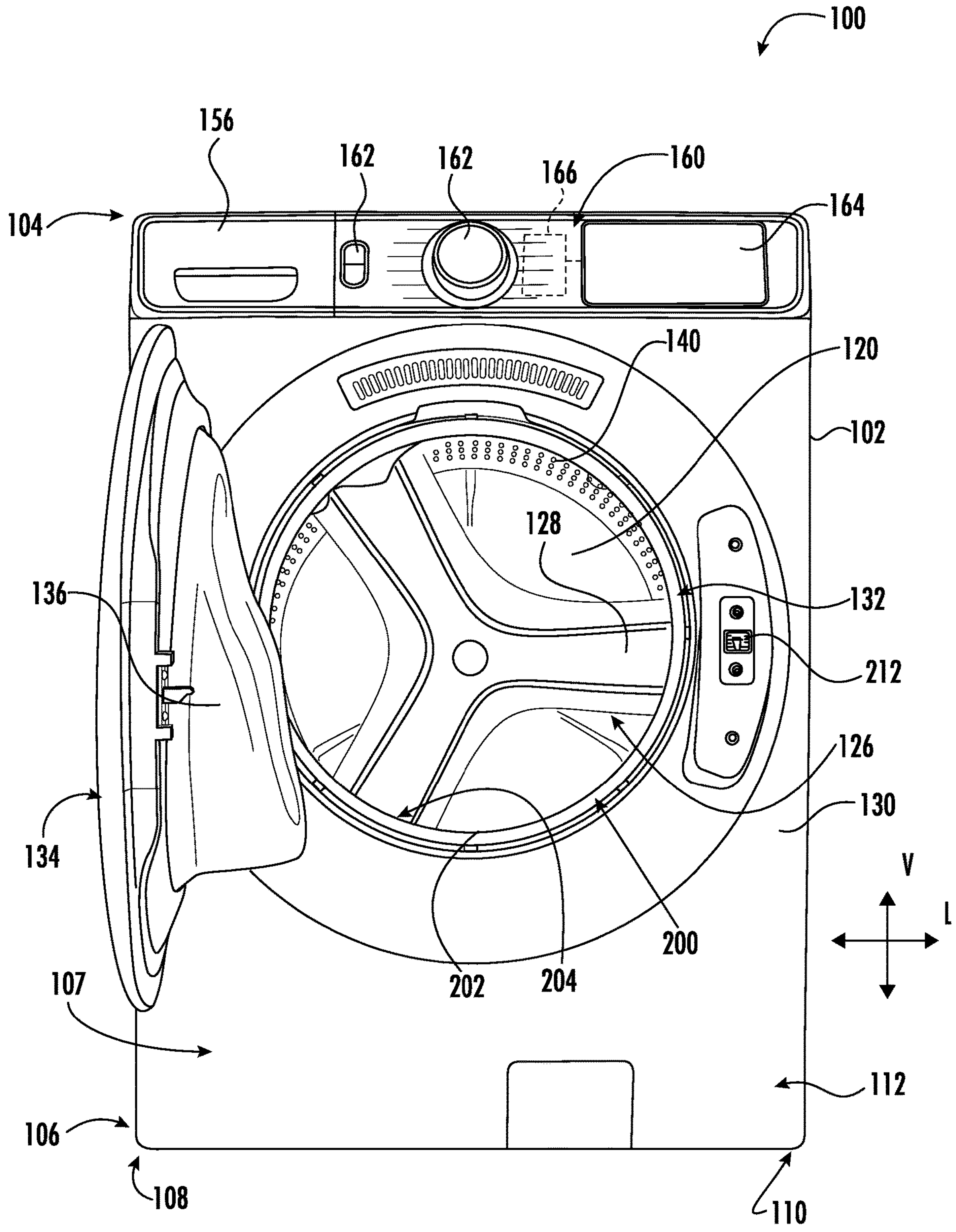
FIG. 2 provides a front view of the example washing machine appliance of FIG. 1 with a door in the open position according to an example embodiment of the present subject matter.
Figure 3:
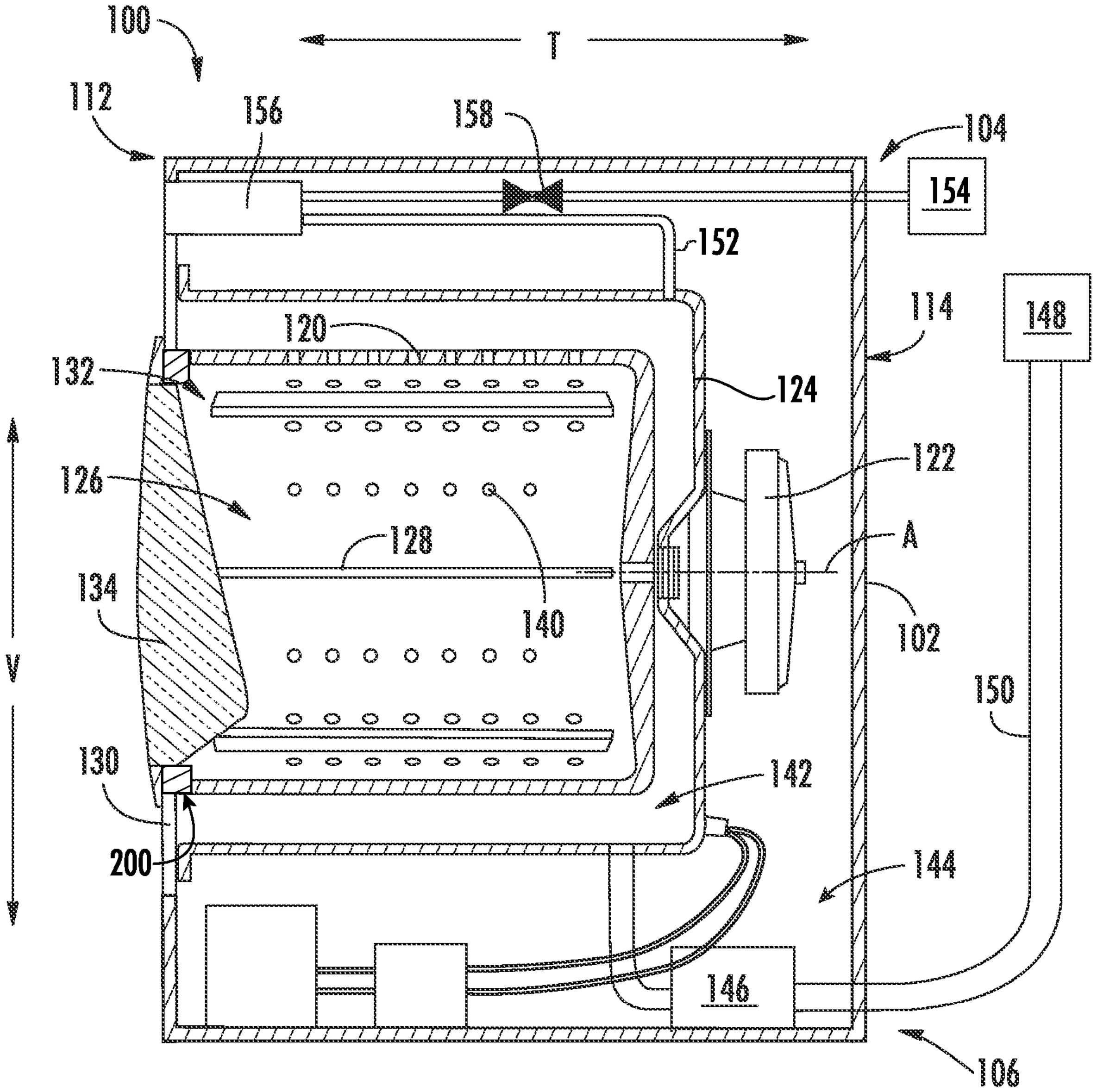
FIG. 3 provides a side cross-sectional view of the example washing machine appliance of FIG. 1 according to an example embodiment of the present subject matter.
Figure 4:
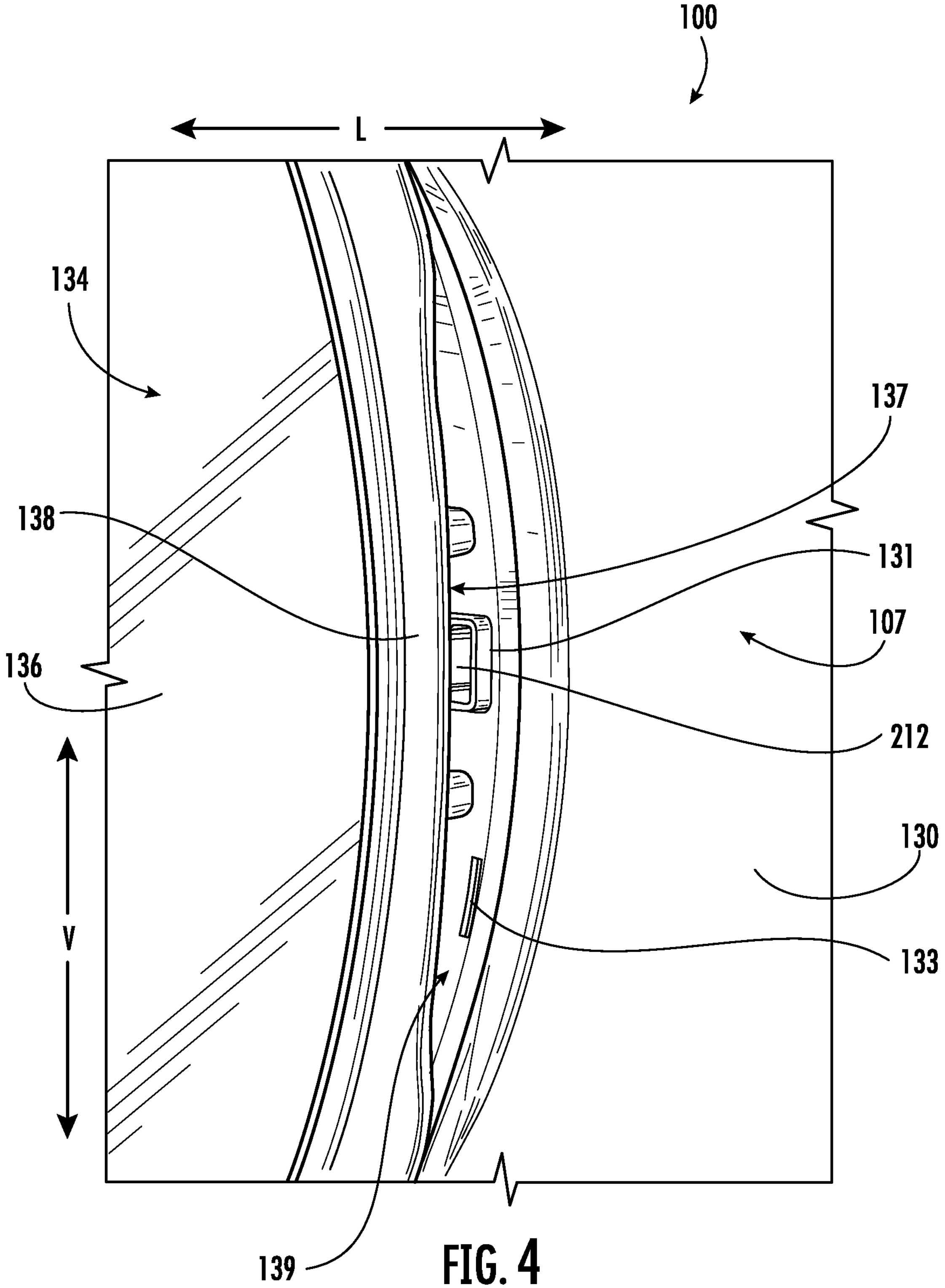
FIG. 4 provides another perspective view of the example washing machine appliance of FIG. 1 according to an example embodiment of the present subject matter.
Figure 5:
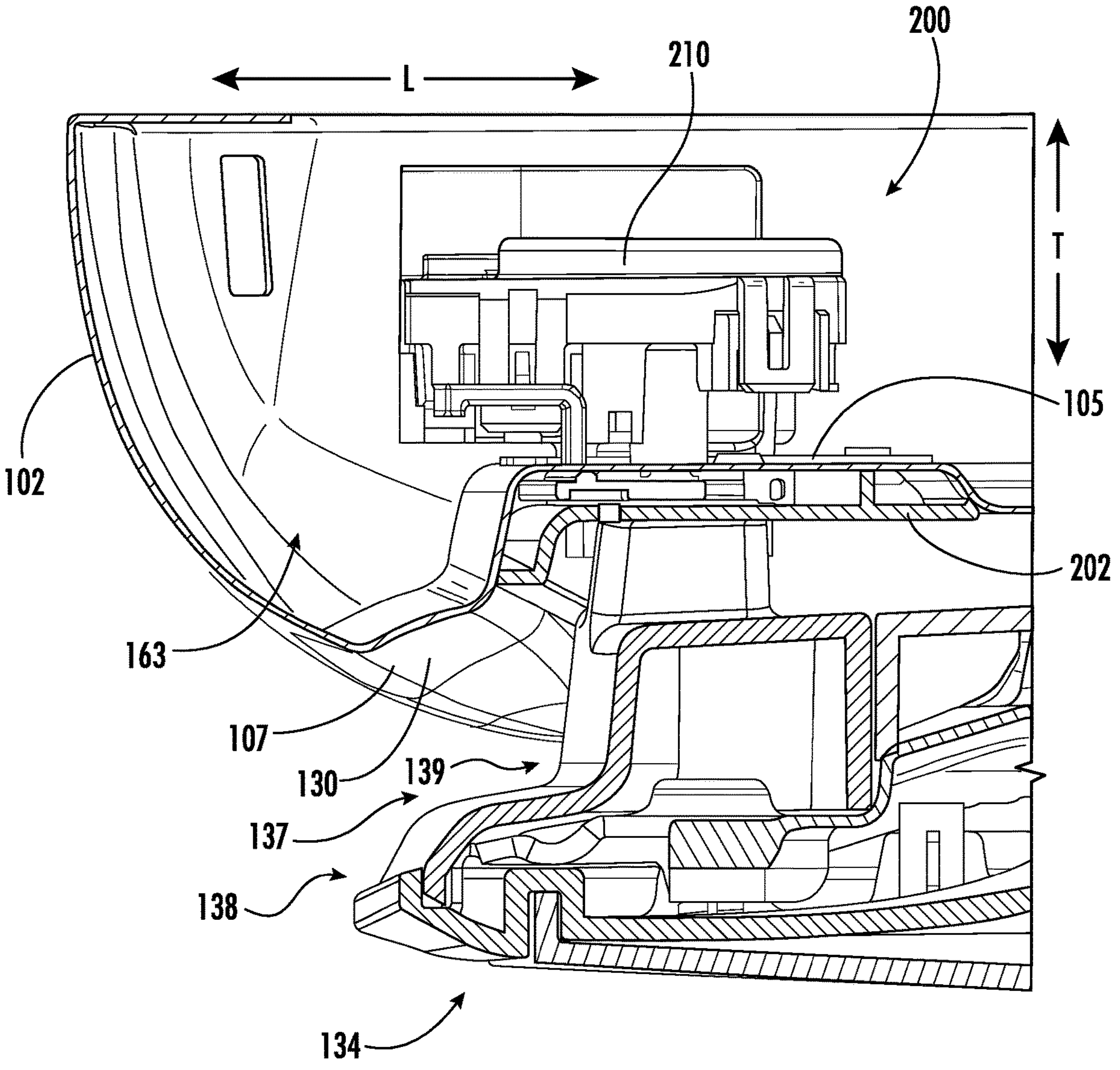
FIG. 5 provides a top, cross-sectional view of an example door lock assembly according to an example embodiment of the present subject matter.

Referring now to the figures, FIG. 1 is a perspective view of an exemplary horizontal axis washing machine appliance 100, FIG. 2 is a front view of washing machine appliance 100, FIG. 3 is a side cross-sectional view of washing machine appliance 100, and FIG. 4 is another perspective view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIGS. 2 and 3, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 3, a plurality of ribs 128 extends from basket 120 into wash chamber 126. In this manner, for example, ribs 128 may lift articles disposed in wash basket 120 during rotation of wash basket 120.

Referring generally to FIGS. 1 through 4, cabinet 102 also includes a front panel 130 which defines a chamber opening 132 that permits user access to wash basket 120 of wash tub 124. More specifically, washing machine appliance 100 includes a door 134 that is positioned over chamber opening 132 and is rotatably mounted to front panel 130. In this manner, door 134 permits selective access to chamber opening 132 by being movable between an open position (FIG. 2) facilitating access to a wash tub 124 and a closed position (FIGS. 1, 4) prohibiting access to wash tub 124.

A window 136 in door 134 permits viewing of wash basket 120 when door 134 is in the closed position, e.g., during operation of washing machine appliance 100. As best illustrated in FIG. 4, door 134 also includes a handle 138 that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 3, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

A spout 152 is configured for directing a flow of fluid into wash tub 124. For example, spout 152 may be in fluid communication with a water supply 154 in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 3, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive.

In addition, a water supply valve 158 may provide a flow of water from a water supply source (such as a municipal water supply 154) into detergent drawer 156 and into wash tub 124. In this manner, water supply valve 158 may generally be operable to supply water into detergent drawer

156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users.

Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

During operation of washing machine appliance 100, laundry items are loaded into wash basket 120 through chamber opening 132, and washing operation is initiated through operator manipulation of input selectors 162. Wash tub 124 is filled with water, detergent, and/or other fluid additives, e.g., via spout 152 and or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain pump assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through chamber opening 132.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances.

Referring to FIG. 1, a schematic diagram of an external communication system 170 will be described according to an exemplary embodiment of the present subject matter. In general, external communication system 170 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 170 may be used to transfer data or other information to improve performance of one or more external devices or appliances and/or improve user interaction with such devices.

For example, external communication system 170 permits controller 166 of washing machine appliance 100 to communicate with a separate device external to washing machine appliance 100, referred to generally herein as an external device 172. As described in more detail below, these communications may be facilitated using a wired or wireless connection, such as via a network 174. In general, external device 172 may be any suitable device separate from washing machine appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with washing machine appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control washing machine appliance 100, etc. In addition, external device 172 and remote server 176 may communicate with washing machine appliance 100 to communicate similar information.

In general, communication between washing machine appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with washing machine appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Referring now to FIGS. 1 through 2 and 4 through 8, a door lock assembly 200 that may be used with the washing machine appliance 100 will be described according to example embodiments of the present subject matter. The door lock assembly 200 is used to selectively lock or unlock the door 134 of the washing machine appliance 100 during, for example, a wash or rinse cycle. As such, the door lock assembly 200 includes a door lock 210 (FIGS. 5, 8) including a latch 212 (FIGS. 2, 4, 6) moveable between a locked or extended position for locking the door 134 in the closed position, and an unlocked or retracted position for unlocking the door 134. Notably, the latch 212 of the door lock 210 remains in the closed position while the washing machine appliance 100 is undergoing a wash or rinse cycle and, thus, prevents the door 134 from being opened, even when the washing machine appliance 100 experiences loss of power during the wash or rinse cycle. This prohibits users from opening the door 134 to access the wash chamber 126.

Figure 8:
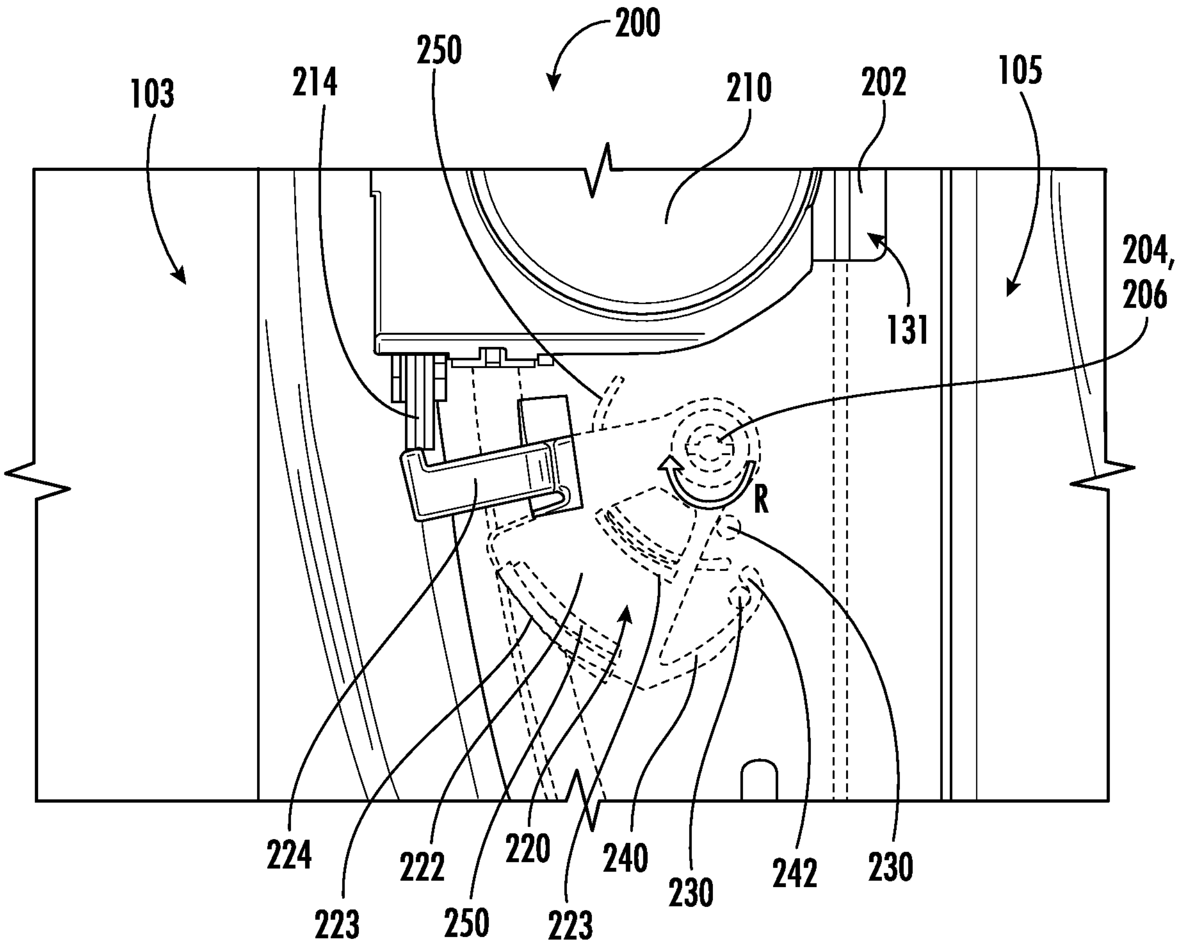
FIG. 8 provides a rear view of the example door lock assembly of FIG. 5 with a reset actuator of a door lock in an extended position and a reset lever in a disengaged position according to an example embodiment of the present subject matter.

In order to permit access to wash chamber 126 in certain situations (e.g., such as a loss of power), the door lock 210 includes a reset mechanism or actuator which may be manually actuated or moved for moving the latch 212 from the locked position to the unlocked position to unlock the door 134 of the washing machine appliance 100. This allows users to open the door 134 to access the wash chamber 126. As best illustrated in FIG. 8, the reset actuator may be a reset pin 214 positioned within an interior 103 of the cabinet 102 behind the front panel 130 and moveable from an extended position to a retracted position to adjust the latch 212 from the locked position to the unlocked position. However, it should be appreciated the reset actuator may be any other suitable actuating component, such as a button, lever, and/or the like. As explained above, since the reset actuator is located within a conventional washing machine appliance, disassembly/removal of components of the washing machine appliance is necessary to access the reset actuator. Such disassembly/removal of components to access the reset actuator is complicated for users. Accordingly, however, aspects of the present subject matter are directed to door lock assembly 200 and features for addressing these and other issues experienced with conventional door lock assemblies.

According to example embodiments, the door lock 210 of the door lock assembly 200 is positioned and extends within an interior 103 of the cabinet 102 of the washing machine appliance 100. In some embodiments, the door lock 210 may be mounted to an interior side 105 of the front panel 130 of the cabinet 102. The front panel 130 may close off or prohibit access to the door lock 210. However, in alternative embodiments, the door lock 210 may be mounted to a door lock cover 202 via an opening 131 defined by the front panel 130. The door lock cover 202 may be mounted to an exterior side 107 of the front panel 130 for prohibiting or closing off access to the door lock assembly 200. Additionally, the door lock cover 202 may be removable for providing access to the door lock assembly 200 when the door 134 is open. Furthermore, when in the locked position, the latch 212 of the door lock 210 may extend through the opening 131 defined by the front panel 130 to engage and lock the door 134.

Figure 6:
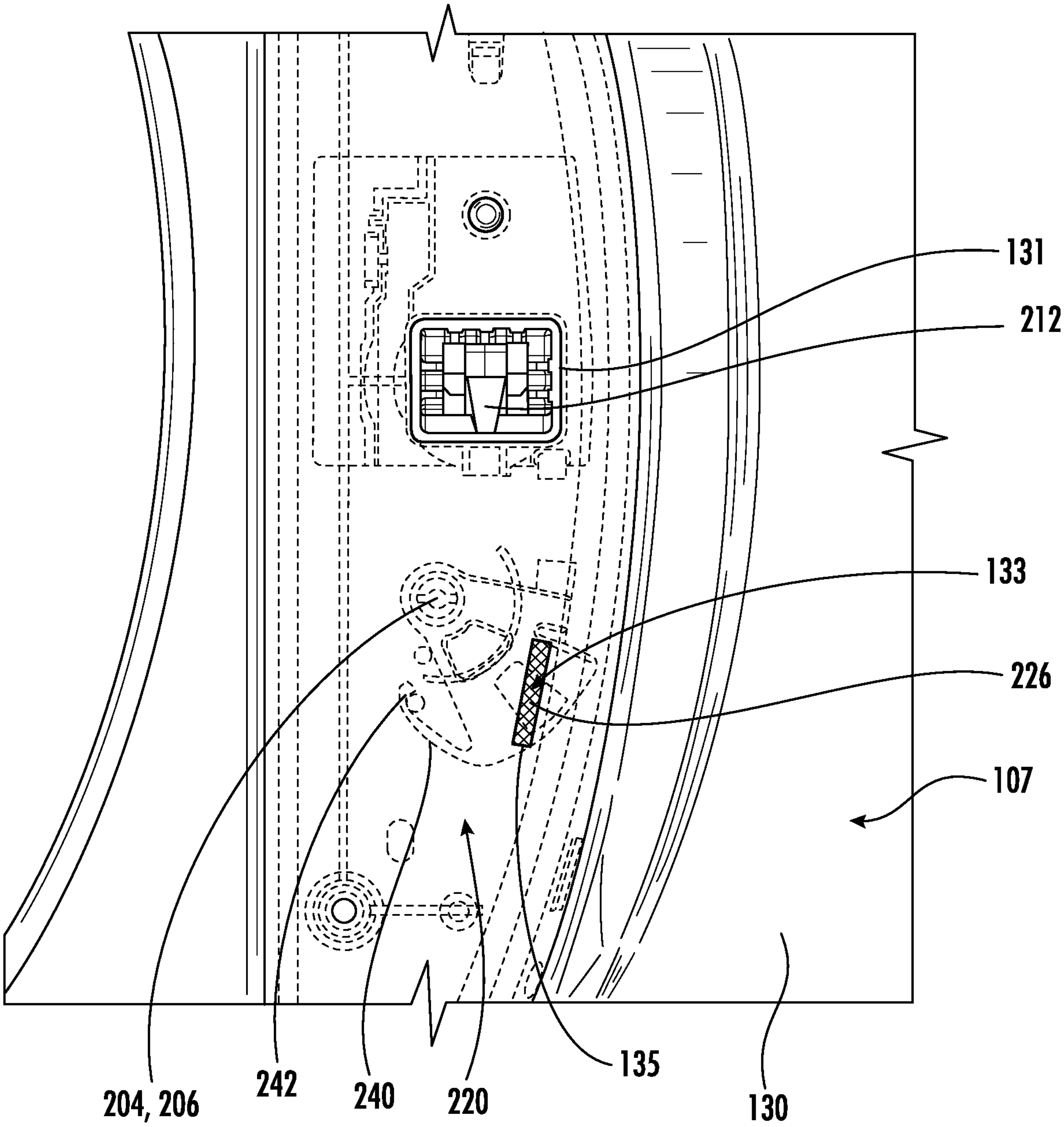
FIG. 6 provides a front view of the example door lock assembly of FIG. 5 according to an example embodiment of the present subject matter.
Figure 7:
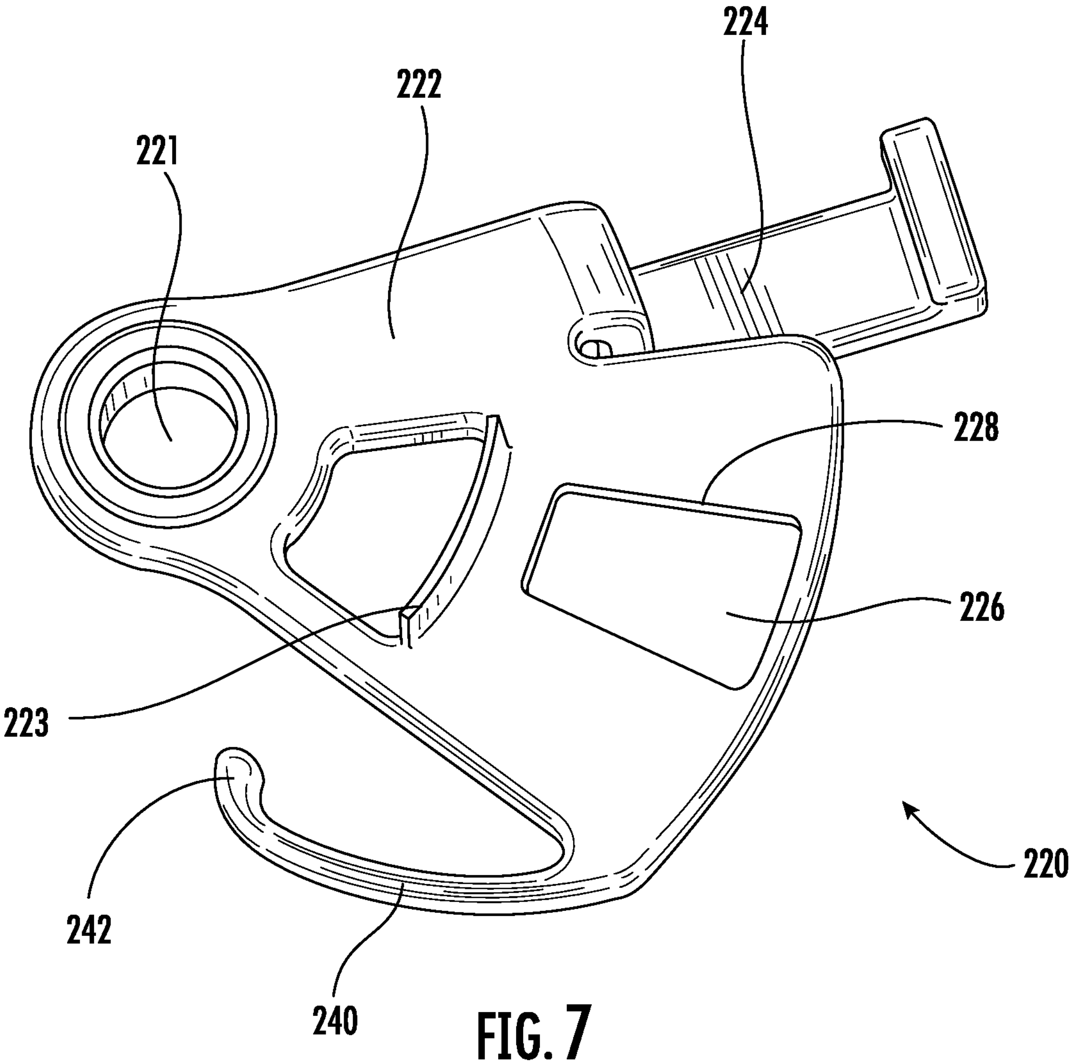
FIG. 7 provides a perspective view of a reset lever of the example door lock assembly of FIG. 5 according to an example embodiment of the present subject matter.

As best illustrated in FIGS. 6 through 8, the door lock assembly 200 includes a reset lever 220 for engaging the reset pin 214 of the door lock 210 to reset the latch 212 by adjusting the latch 212 from the locked position to the unlocked position. The reset lever 220 may be rotatably mounted to the interior side 105 of the front panel 130 of the cabinet 102 about a pivot joint 204. The reset lever 220 may thus be rotatable about the pivot joint 204 in a direction of rotation R between a disengaged position (FIG. 8) and an engaged position (not shown) in which the reset lever 220 moves the reset pin 214 from the extended position to the retracted position. For example, as best illustrated in FIG. 8, the pivot joint 204 may correspond to a barrel snap 206 protruding from the interior side 105 of the front panel 130. The barrel snap 206 is received within an opening 221 defined by the reset lever 220. The reset lever 220 may thus be rotatable about the barrel snap 206 in the direction of rotation R between the disengaged position and the engaged position. However, in embodiments that include the door lock cover 202, the reset lever 220 may be rotatably mounted to the door lock cover 202. Additionally, or alternatively, it should be appreciated that the reset lever 220 may move translationally to move the reset pin 214 from the extended position to the retracted position. For example, the reset lever 220 may be slidably mounted to the front panel 130 for moving the reset pin 214 from the extended position to the retracted position.

According to example embodiments, the reset lever 220 may include a lever body 222 and a lever arm 224 extending or protruding from the lever body 222. As best illustrated in FIG. 8, the lever arm 224 may be aligned with the reset pin 214 for engaging the reset pin 214 of the door lock 210. In this respect, the lever arm 224 applies an increasing load to the reset pin 214 as the reset lever 220 is rotated about the pivot joint 204 for moving the reset pin 214 from the extended position to the retracted position and, thus, adjust the latch 212 from the locked position to the unlocked position.

As best illustrated in FIG. 7, the lever body 222 of the reset lever 220 may define a recessed portion or groove 226 for rotating the reset lever 220 between the disengaged position and the engaged position. A groove wall 228 may surround the recessed portion 226. An object for rotating the reset lever 220, such as a finger or a tool, may be inserted into the recessed portion 226 for contacting and applying force to the groove wall 228 to rotate the reset lever 220.

According to example embodiments, one or more limits stops 230 may limit rotation of the reset lever 220. As best illustrated in FIG. 8, a pair of limit stops 230 protrude from the interior side 105 of the front panel 130 of the cabinet 102. The pair of limit stops 230 limit rotation of the reset lever 220 by preventing gravity from rotating the reset lever 220 beyond the disengaged position. As such, when the reset lever 220 is in the disengaged position, the reset lever 220 rests against the limit stops 230. This prevents the recessed portion 226 of the lever body 222 from becoming misaligned with, as will be described below, a reset opening or slot 133 for accessing and rotating the reset lever 220 from the exterior of the washing machine appliance 100.

According to example embodiments, the reset lever 220 may include a biasing element 240, such as a leaf spring, for biasing the reset lever 220 in the disengaged position. The biasing element 240 may protrude from the lever body 222 and be detachably coupled to one of the limit stops 230. For example, the pair of limit stops 230 may be cylindrically shaped and the biasing element 240 may include a hooked portion 242 that attaches around one of the cylindrically shaped limit stop 230 for holding the reset lever 220 in the disengaged position thus preventing the reset lever 220 from moving from the disengaged position. The object that is inserted into the recessed portion of the lever body 222 for moving the reset lever 220 applies force to the groove wall 228 to pull and detach the hooked portion 242 of the biasing element 240 from the limit stop 230 and, thus, rotate the reset lever 220 from the disengaged position.

According to example embodiments, one or more arced guide rails 250 (FIG. 8) may protrude from the interior side 105 of the front panel 130 of the cabinet 102 and/or the reset lever 220 for guiding rotation of the reset lever 220 between the disengaged position and the engaged position. The arced guide rails 250 may also limit rotational movement created by movement/vibration during operation of the washing machine appliance 100 for preventing the reset lever 220 from engaging the reset pin 214 of the door lock 210. Likewise, the arced guide rails 250 may limit translational movement of the reset lever 220, which may be created by movement/vibration during operation of the washing machine appliance 100, to prevent misalignment of the lever arm 224 and the reset pin 214 of the door lock 210. The lever body 222 presses against the arced guide rails 250 that protrude from the interior side 105 of the front panel 130 of the cabinet 102. Likewise, the arced guide rails 250 that protrude from the lever body 222 press against the interior side 105 of the front panel 130. The lever body 222 and/or the interior side 105 of the front panel 130 may have corresponding flanges 223 that protrude from the interior side 105 of the front panel 130 and/or the lever body 222 that engage/contact the corresponding arced guide rails 250 as the reset lever 220 is rotated to guide rotation of the reset lever 220.

According to example embodiments, the reset opening or slot 133 is defined through the front panel 130 of the cabinet 102 for providing access to the reset lever 220. As such, a user may access the reset lever 220 from the exterior of the washing machine appliance 100 without disassembly/removal of components of the washing machine appliance 100. The recessed portion 226 of the lever body 222 may be aligned with the reset opening 133 so that the object for rotating the reset lever 220 may be inserted through the reset opening 133 and into the recessed portion of the reset lever 220. Additionally, a removable reset opening panel 135 (FIG. 6) may cover the reset opening 133 for prohibiting/closing off access to the reset opening 133 and, thus, the reset lever 220. A user may remove the reset opening panel 135 when access to the reset lever 220 is desired.

According to example embodiments, the door 134 of the washing machine appliance 100 may define a recessed handle portion 137 (FIGS. 4-5) behind the handle 138 in the direction T. An access gap 139 (FIGS. 4-5) may be defined between the front panel 130 of the cabinet 102 and the handle 138 of the door 134 for providing access to the reset opening 133 of the front panel 130. As such, a user may access the reset opening 133 and, thus, the reset lever 220 from the exterior of the washing machine appliance 100 without disassembly/removal of components of the washing machine appliance 100.

As explained herein, aspects of the present subject matter are generally directed to a door lock assembly design of a washing machine appliance that includes a door lock and a reset lever accessible via an opening within the front panel of the cabinet of the washing machine appliance. This door lock assembly including the door lock and the reset lever accessible via the opening within the front panel of the cabinet of the washing machine appliance allows users to reset the door lock without removal/disassembly of components (e.g., the front panel, the top panel) of the washing machine appliance to access the manual reset mechanism of the door lock.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
- a cabinet comprising a front panel defining a chamber opening;
- a wash tub positioned within the cabinet and defining a wash chamber;
- a wash basket rotatably mounted within the wash tub for receiving a load of clothes;
- a door rotatably mounted to the front panel and moveable between an open position for providing access to the wash chamber and a closed position for prohibiting access to the wash chamber; and
- a door lock assembly for selectively locking the door in the closed position, the door lock assembly comprising:
  - a door lock extending within the cabinet, the door lock comprising a latch moveable between an extended position and a retracted position, the door lock also comprising a reset actuator for moving the latch from a locked position to an unlocked position; and
  - a reset lever for engaging the reset actuator of the door lock to move the latch from the locked position to the unlocked position, the reset lever rotatably mounted within the cabinet; and
- wherein;
  - the front panel of the cabinet defines a reset opening for providing access to the reset lever; and
  - the reset lever is rotatable by a member that extends through the reset opening.

2. The washing machine appliance of claim 1, wherein the reset lever is rotatably mounted to the front panel of the cabinet.

3. The washing machine appliance of claim 1, further comprising:
- a door lock cover mounted to the front panel of the cabinet for prohibiting access to the door lock assembly, and
- wherein, the reset lever is rotatably mounted to the door lock cover.

4. The washing machine appliance of claim 1, the reset lever including a lever arm for engaging the reset actuator of the door lock to move the latch from the locked position to the unlocked position.

5. The washing machine appliance of claim 4, wherein the reset actuator is moveable from an extended position to a retracted position to move the latch from the locked position to the unlocked position.

6. The washing machine appliance of claim 5, wherein the lever arm of the reset lever is aligned with the reset actuator and the reset lever is rotatable between a disengaged position and an engaged position in which the lever arm moves the reset actuator from the extended position to the retracted position.

7. The washing machine appliance of claim 6, wherein the front panel of the cabinet includes one or more limit stops protruding therefrom for limiting rotation of the reset lever.

8. The washing machine appliance of claim 7, wherein the reset lever includes a biasing element for biasing the reset lever in the disengaged position, the biasing element detachably coupled to one of the limit stops.

9. The washing machine appliance of claim 6, wherein the front panel of the cabinet includes one or more arced guide rails protruding therefrom for guiding rotation of the reset lever between the disengaged position and the engaged position.

10. The washing machine appliance of claim 1, wherein the reset lever defines a recessed portion aligned with the reset opening of the front panel of the cabinet for rotating the reset lever via the reset opening of the front panel.

11. The washing machine appliance of claim 1, wherein the reset actuator is configured as one of a pin, button, or lever moveable from an extended position to a retracted position to move the latch from the locked position to the unlocked position.

12. The washing machine appliance of claim 10, wherein the door defines a recessed portion such that a gap is defined between the front panel of the cabinet and the door for providing access to the reset opening of the front panel.

13. The washing machine appliance of claim 1, wherein:

the front panel of the cabinet includes a barrel snap protruding therefrom;

an opening is defined within the reset lever for receiving the barrel snap therethrough; and the reset lever is rotatable about the barrel snap.

14. A door lock assembly for a washing machine appliance, the washing machine appliance comprising a cabinet comprising a front panel defining a chamber opening, the washing machine appliance also comprising a wash tub positioned within the cabinet and defining a wash chamber, the washing machine appliance also comprising a door rotatably mounted to the front panel and moveable between an open position for providing access to the wash chamber and a closed position for prohibiting access to the wash chamber, the door lock assembly for selectively locking the door in the closed position, the door lock assembly comprising:

a door lock extending within the cabinet, the door lock comprising a latch moveable between a locked position and an unlocked position, the door lock also comprising a reset actuator for moving the latch from the locked position to the unlocked position; and a reset lever for engaging the reset actuator of the door lock to move the latch from the locked position to the unlocked position, the reset lever rotatably mounted within the cabinet; and wherein:

the front panel of the cabinet defines a reset opening for providing access to the reset lever; and the reset lever is rotatable by a member that extends through the reset opening.

15. The door lock assembly of claim 14, wherein the reset lever is rotatably mounted to the front panel of the cabinet.

16. The door lock assembly of claim 14, the reset lever including a lever arm for engaging the reset actuator of the door lock to move the latch from the locked position to the unlocked position.

17. The door lock assembly of claim 16, wherein the reset actuator is moveable from an extended position to a retracted position to move the latch from the locked position to the unlocked position.

18. The door lock assembly of claim 17, wherein the lever arm of the reset lever is aligned with the reset actuator and the reset lever is rotatable between a disengaged position and an engaged position in which the lever arm moves the reset actuator from the extended position to the retracted position.

19. The door lock assembly of claim 18, wherein the front panel of the cabinet includes one or more limit stops protruding therefrom for limiting rotation of the reset lever.

20. The door lock assembly of claim 14, wherein the reset lever defines a recessed portion aligned with the reset opening of the front panel of the cabinet for rotating the reset lever via the reset opening of the front panel.

* * * * *